United States Patent
Du

(10) Patent No.: US 7,076,367 B2
(45) Date of Patent: Jul. 11, 2006

(54) PREVENTIVE METHOD FOR PREVENTING SUICIDAL HIJACK BY MEANS OF AIRCRAFT-CARRIED GLOBAL POSITION ELECTRONIC MAP

(75) Inventor: Erwen Du, 12-2-5, Guangminglou, Chongwen District, Beijing, 100061 (CN)

(73) Assignees: Erwen Du, Beijing (CN); China Aviation Industry Corporation II Lanzhou Flight Control Instrument General Factory, Lanzhou (CN)

( * ) Notice: Subject to any disclaimer, the term of this patent is extended or adjusted under 35 U.S.C. 154(b) by 86 days.

(21) Appl. No.: 10/801,116

(22) Filed: Mar. 16, 2004

(65) Prior Publication Data

US 2004/0249523 A1 Dec. 9, 2004

Related U.S. Application Data

(63) Continuation of application No. PCT/CN02/00661, filed on Sep. 17, 2002.

(30) Foreign Application Priority Data

Sep. 17, 2001 (CN) .................................. 01142182

(51) Int. Cl.
*G06F 7/00* (2006.01)
*G06F 17/10* (2006.01)
(52) U.S. Cl. .................................. 701/301; 342/357.06
(58) Field of Classification Search .................... 701/3, 701/4, 7, 9, 11, 14, 211, 213, 207, 208, 209, 701/210, 301; 342/29, 36, 357.03–357.17
See application file for complete search history.

(56) References Cited

U.S. PATENT DOCUMENTS 6,239,743 B1 * 5/2001 Lennen .................. 342/357.12
6,385,513 B1 * 5/2002 Murray et al. ................. 701/14

(Continued)

FOREIGN PATENT DOCUMENTS

GB 2335002 A 9/1999

(Continued)

OTHER PUBLICATIONS

International Search Report for PCT/CN02/00661, 4 pages.

*Primary Examiner*—Richard M. Camby
(74) *Attorney, Agent, or Firm*—Sterne, Kessler, Goldstein & Fox P.L.L.C.

(57) ABSTRACT

A preventive method for preventing suicidal hijack by means of aircraft-carried global position electronic map is disclosed. The data such as the identity of the pilot on the aircraft, the real-time data of the aircraft-carried global position device, the electronic maps of the flight courses, data for automatically entering aerodromes, data for ground piloting, data of the fixed or movable targets on the ground or water requested to be protected, and the pre-fixed electronic maps of the flight-prohibition targets within the whole airspace, are collected and processed by computers, so as to determine whether the aircraft is in a legal or illegal manipulation condition, and thereby automatically protect the flight security and public security. By means of high-techs, this invention enhances the ability of aircrafts for preventing suicidal hijacks. Thus incidents such as 9.11 suicidal hijack can be prevented. In case of a normal hijack, the pilot can still deal with such accident according to conventional flight routine, but the aircraft will automatically refuse flying to the flight-prohibition targets.

10 Claims, 1 Drawing Sheet

U.S. PATENT DOCUMENTS 6,675,095 B1 * 1/2004 Bird et al. .................. 701/301
2003/0014165 A1 * 1/2003 Baker et al. .................... 701/3
2003/0055540 A1 * 3/2003 Hansen .......................... 701/3

FOREIGN PATENT DOCUMENTS

JP         9020297 A      1/1997

* cited by examiner

PREVENTIVE METHOD FOR PREVENTING SUICIDAL HIJACK BY MEANS OF AIRCRAFT-CARRIED GLOBAL POSITION ELECTRONIC MAP

TECHNICAL FIELD

This invention relates to a computerized anti-hijack automatic processor, by presetting the relevant values of the protected targets in an electronic map, by means of aircraft-carried global position techniques.

BACKGROUND OF THE INVENTION

In Sep. 11, 2001, the World Trade Center in New York, U.S. and some other places experienced tragic suicidal attacks by the hijackers, which brought an enormous shock to the world. To prevent such incidents from re-occurring in the world, in addition to strengthening the routine investigation and safety check, new techniques are needed to prevent such incidents. To this end, the inventor develops this invention.

SUMMARY OF THE INVENTION

This invention is featured by using high-tech apparatus to strengthen the ability of the aircraft per se in preventing suicidal hijack.

The technical solution of this invention is a preventive method for preventing suicidal hijack by means of aircraft-carried global position techniques, wherein a flight control apparatus is provided in an aircraft. Said flight control apparatus includes flight-prohibition area information. According to the flight-prohibition area information and the flight data of the aircraft, the flight control apparatus prevents the aircraft from flying to the flight-prohibition destinations.

The output data of normal aircraft-carried equipments is acquired.

Identifier (A): sensors for identification of fingerprint (S1), eyeground (S2), voice of specific person (S3), non-contact personal information chip (S4), face (S5) and so on are provided on the manipulation device of an aircraft. At least one of the sensors is provided to transmit the acquired data.

Pilot sensor (B): for transmitting real-time data of pilot condition from an automatic pilot (7) and a manual pilot (8).

Global position device (C): the real-time data is output from an aircraft-carried global position device (e.g., a position device having position precision less or equal to 1 meter, or other existing global position device such as GPS).

Flight database (D): including an electronic map database programmed with fixed data of limited lowest height over the places and consecutive latitude and longitude values of each flight course, and data for automatic entering an aerodrome.

Height detector (F): the detected real-time height-to-ground data is output from the flight height detector.

Also, the following data are acquired in the aircraft-carried equipments of this invention.

Flight-prohibition database (E): an electronic map database including fixed data of the limited lowest height and corresponding latitude and longitude value of the flight-prohibition ground destinations within the whole airspace.

Emergency database: the emergency database (G) is controlled by a radio receiver (2) and a sub-computer (3), and includes emergency sub-database (D1) and (D2). The data therein is read-only to the main computer (1). The emergency sub-database (D1) and (D2) of the emergency database (G) are readable-and-writable storage which can be set as write-protective, or encrypted readable-and-writable storage.

The emergency sub-database (D1) of the emergency database (G) includes temporary piloting data. During the flight of the aircraft, the electronic map data of flight height and consecutive latitude and longitude values for piloting, and piloting data for automatic entering an aerodrome are programmed by a ground emergency computer, and transmitted from a nearest ground supervision center (4), through a specific direct radio channel of public global mobile communication network. The emergency sub-database (D1) is controlled by the instruction from the supervision center to write, update, and fix or unfix said temporary piloting data.

The emergency sub-database (D2) is used to store data of the ground, water, and mobile establishments flied over by the aircraft. The geographical mark data (5) of flight-prohibition protection requested by users is transmitted through distributable direct specific radio channel of public global mobile communication network. The geographical mark data is received and calculated by the user's ground global satellite receiver (6) (e.g., GPS receiver), to establish the requested flight-prohibition data of latitude and longitude values and the altitude of the receiving point.

During flight, the data of the identifier (A), pilot sensor (B), global position device (C), flight database (D), flight-prohibition database (E), height detector (F), emergency database (G) are entered into the main computer. It is preferential to compare and calculate the data of the global position device (C) with the data of the flight database (D), flight-prohibition database (E), height detector (F), and emergency database (G). Upon the following processing, the main computer determines whether to take necessary measures to instruct the automatic pilot and the like to operate (W) according to preset security content.

DETAILED DESCRIPTION OF THE INVENTION

Figure 1:
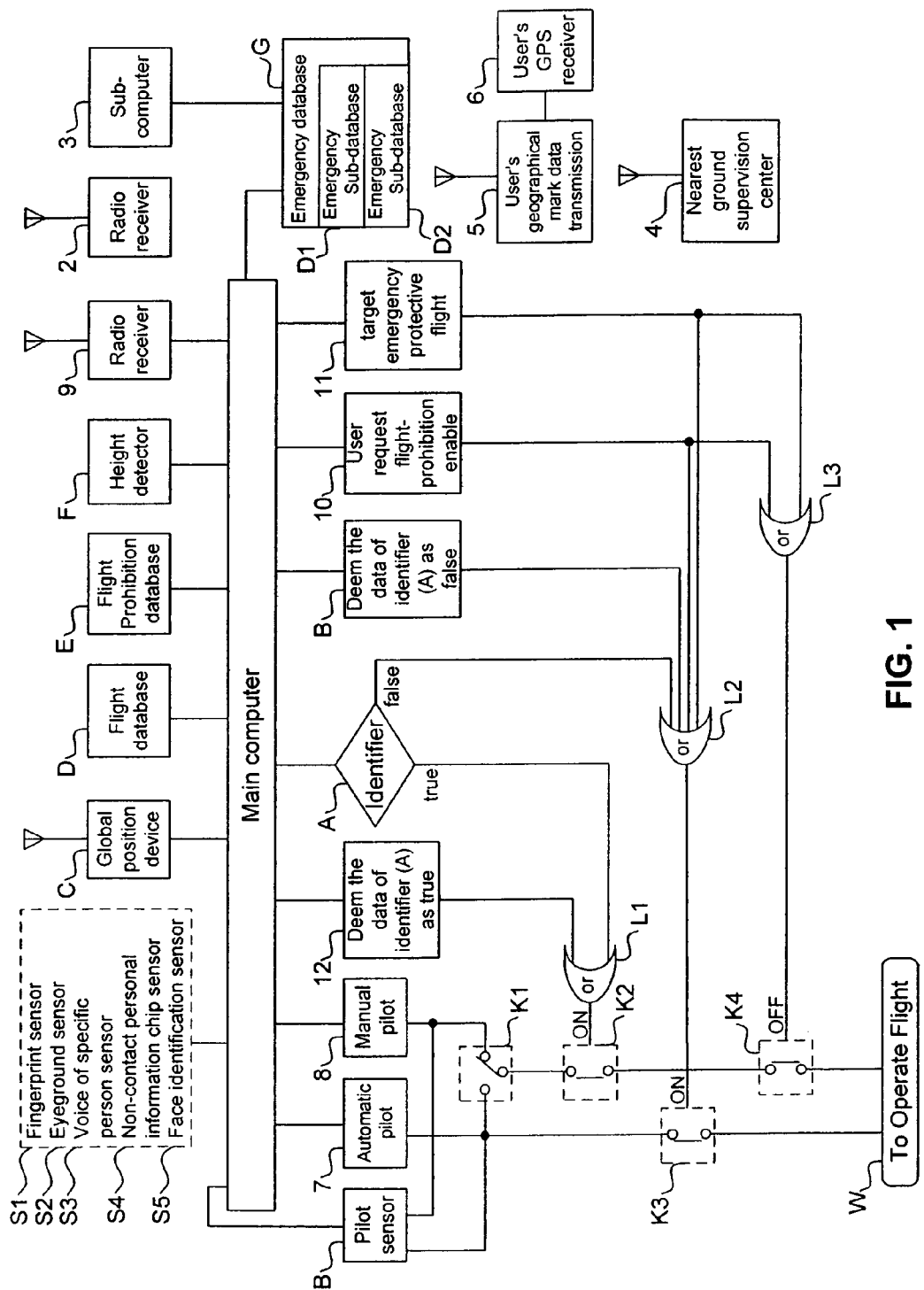
FIG. 1 is a diagram showing the preventive process for preventing suicidal hijack by means of aircraft-carried global position electronic map according to the present invention.

Referring to FIG. 1, the data of the identifier (A) is acquired to identify the true and false of the identity or status of the driver. If the aircraft is not provided with the identifier (A), the default data of the identifier (A) is deemed as true by the main computer (12).

If true, the main computer outputs information to instruct the aircraft to accept manual or automatic pilot control. The main computer timely compares and calculates data of the pilot sensor (B), global position device (C), flight-prohibition database (E), height detector (F), monitors and executes the instructions of the flight-prohibition ground destinations preset in the flight-prohibition database (E) and instructions of the flight-prohibition destinations requested by the users in the emergency sub-database (D2), and automatically transmits the real-time position information of the global position value of the aircraft to relevant ground supervision center. During flight, the real-time data of the global position device (C), height detector (F), the pilot sensor (B) and so on are compared and calculated with the data of the flight-prohibition database (E), the emergency sub-database (D2). If relevant abnormity occurs, the main computer deems the data of identifier (A) as false (13). When the relevant condition becomes normal after a rectifying action by the aircraft, the main computer switch to deem the data of the identifier (A) as true (12).

If false, or the identifier (A) is destroyed, the main computer outputs signal instructing the aircraft not to accept manual pilot control. At this time, the main computer only operates and compares the data of the automatic pilot, the global position device (C), flight database (D), flight-prohibition database (E), height detector (F), and emergency database (G), executes the instructions in the flight database (D), flight-prohibition database (E), and emergency database (G), instructs the automatic pilot to perform automatic pilot actions, rectifies and locks the flight course, height, speed and the landing course, sets that the data of the pilot sensor (B), global position device (C), flight database (D), flight-prohibition database (E), height detector (F), and emergency database (G) cannot be manually changed by personnel on the aircraft so as to be protected, and protects the oil and power supply on the aircraft, and do not accept the instruction of stopping the running of the engine during flight. For example, the system program can be protected by using a readable-and-writable storage which can be set as write-protected, or using an automatic encrypted readable-and-writable storage. The real-time position information of the global position values of the aircraft and alarm are automatically transmitted to the nearest ground supervision center.

The emergency database (G) on the aircraft receives information transmitted from the nearest supervision center on the ground. According to the instruction received by means of radio from the supervision center on the ground, the sub-computer causes the emergency sub-database (D1) to write, update, and fix or unfix the data in the emergency electronic map. The main computer on the aircraft compares and calculates the sub-database (D1) by using the data of the global position device (C), height detector (F), and the automatic pilot, so as to perform the tasks of flight, entering an aerodrome, transferring to another aerodrome, peremptorily controlled by the supervision center on the ground.

In the above global position electronic map, the latitude and longitude values of the flight-prohibition targets are preset by the flight supervision center and security personnel. The targets are mostly known important fixed establishments on the ground and on the water, and are preset as flight-prohibition. But due to elapsing of time or the programmer not knowing new targets, some potential targets that may be attacked by suicidal hijack may be omitted. And it is helpless to the movable targets on the ground or on the water. To compensate this defect, the movable targets on the ground or on the water intended to be protected are allowed to request a geographic mark to the flight supervision authority. The geographic mark is solely or integrally transmitted via simple and distributed direct specific channel of the public global mobile communication network. Signals are taken from the user's own global position system receiver (GPS receiver), and are the latitude and longitude values of its own and the altitude value of the receiving point of the receiver, which values are determined by the operation of the receiver. During flight, the aircraft will receive data of one or more local geographic marks requested to be protected. In an aircraft provided with the above electronic map preventive means, the received data are stored into the emergency sub-database (D2) and fixed via a radio receiver and the sub-computer. The main computer immediately processes the requests of the flight-prohibition latitude and longitude values, and promptly transmits alarm and its own real-time position information and the content in the emergency sub-database (D2) to the nearest supervision center. Meanwhile, the sub-computer on the aircraft peremptorily starts the emergency sub-database (D1), to receive electronic map data for emergency processing transmitted from the nearest ground supervision center, and to write, update and fix the data for emergency use according to the instruction from the supervision center. According to the preset classified regulations for different type of aircrafts (mainly classified by the maximum flight speed), the main computer identifies the altitude in the data of flight-prohibition geographic mark requested by the user. For a flight space over a threshold of the altitude plus H meters, if the type of aircraft is within the space, then the aircraft does not respond to the flight-prohibition request, so as to not influence the flight on the normal flight course. For a flight space below a threshold of the altitude plus H meters, if the type of aircraft is within the space, then the aircraft responds to the flight-prohibition request (10). At this time, the main computer on the aircraft compares and calculates the data of the emergency electronic map in the sub-database (D1) by using the real-time data of the global position device (C), height detector (F), and the automatic pilot, so as to be ready to perform the tasks of automatic piloting, entering an aerodrome, or transferring to another aerodrome, peremptorily stipulated by the nearest supervision center on the ground. Meanwhile, the main computer compares, calculates and processes the data of the sub-database (D2) by using the real-time data of the global position device (C), height detector (F), and the automatic pilot. In emergency, it is started to perform flight-prohibition monitoring and execute the instruction of the emergency sub-database D1, from a radius of 15 kilometers around the point of the latitude and longitude values of the targets on the ground or water or movable targets requested to be protected by the user. Within a radius of 2.5 kilometers, the main computer directly performs a target emergency protective flight (11), without using the current instructions of the piloting data, so as to ensure the security of the target. For an aircraft with a velocity of sound, H=700 meters is enough to perform an automatic emergency protective action. For an aircraft with 2.5 times of velocity of sound, it is at least that H=2 kilometers, so as to avoid a diving attack. According to the type of aircrafts of 1 to 2.5 times of velocity of sound, it is selected within 600 meters to 2.5 kilometers.

After the aircraft flies out of a radius of 15 kilometers from the target or is over the altitude plus H meters, the main computer switches the data of the identifier (A) as true. Then, it can be selected whether it is necessary to execute the content in the emergency sub-database (D1).

The above flight-prohibition protective procedure is also applicable to the flight-prohibition destinations in the flight-prohibition database (E).

The identifier (A), pilot sensor (B), global position device (C), flight database (D), flight-prohibition database (E), height detector (F), and emergency database (G) respectively have at least one copy. At least two copy of concealed power supply are provided so as to avoid being destroyed.

This invention has the following positive effects:

1. This invention technically enhanced the function of the aircraft for preventing suicidal hijack. Global position electronic maps are used to preset the limited height over and the latitude and longitude values of the protected targets. And the aircrafts are prevented from flying to the flight-prohibition area. This invention also automatically receives flight-prohibition protection requested by global targets on the ground or water or movable targets. The true or false of the pilot is automatically identified. Corresponding automatic control can be realized. So the hijacker cannot pilot the hijacked aircraft to achieve his object. In emergency, the aircraft can select to firstly automatically protect the flight-prohibition target, then accept and execute the tasks of piloting, entering an aerodrome, or transferring to another aerodrome, controlled by the nearest ground supervision center, or return to normal flight course. Thus incident as 9.11 suicidal hijack can be prevented, so as to strengthen public security.

2. In case the main computer deems the data of the identifier (A) as true, if a hijack occurs, the pilot can still deal with such accident according to conventional flight routine, but the aircraft will automatically refuse flying to the flight-prohibition targets.

3. This is a peaceful use of the high-techs similar to cruse missile.

4. A good commercial prospect can be expected.

The invention claimed is:

1. A preventive method for preventing suicidal hijack by means of aircraft-carried global position electronic map, a flight control apparatus being provided on the aircraft, the method being characterized in that the flight control apparatus includes information of flight-prohibition area, and the flight control apparatus prevents the aircraft from flying to the flight-prohibition destinations according to the information of flight-prohibition area and the flight data of the aircraft, wherein the information of flight-prohibition area includes flight-prohibition database (E), the flight-prohibition database including electronic map values of lowest limited height and latitude and longitude of the flight-prohibition destinations within the whole airspace, which values are preset, and includes the data of the requested flight-prohibition in the emergency sub-database (D2), the data of the requested flight-prohibition including the geographic position and altitude values of stationary and movable establishments on the ground or water which are flight-prohibition destinations, the geographic position and altitude values being transmitted to the aircraft from local users around the world.

2. A method according to claim 1, characterized in that, the flight-prohibition database (E) is programmed and fixed, and the data of requested flight-prohibition is read/written from/in the emergency sub-database (D2) in a readable-and-writable storage manner which can be set as write-protective, or in an encrypted readable-and-writable storage manner.

3. A method according to claim 1 characterized in that the information of flight-prohibition area includes temporary piloting data, the temporary piloting data being electronic map values of flight height and consecutive latitude and longitude for piloting and data for piloting automatically entering an aerodrome, which temporary piloting data are transmitted into the emergency sub-database (D1) of the aircraft from a nearest ground supervision center, wherein when the aircraft is within a predetermined scope with respect to the flight-prohibition destinations, the aircraft flies according to the temporary piloting data; the temporary piloting data is read/written from/in the emergency sub-database (D1) in a readable-and-writable storage manner which can be set as write-protective, or in an encrypted readable-and-writable storage manner; when the aircraft is flying within the emergency protective scope with respect to the flight-prohibition destinations, the aircraft is directly controlled by the main computer in the flight control apparatus, without using any current piloting data.

4. A method according to claim 1, characterized in that the main computer in the aircraft identifies the value of the altitude in the information of flight-prohibition area and automatically sets a value H according to the type of the aircraft, and when the flight height of the aircraft is higher than a threshold which is a summation of the altitude of the establishment plus value H, the aircraft makes no response to the flight-prohibition target, and when the flight height of the aircraft is equal to or less than the threshold, the aircraft makes response to the flight-prohibition.

5. A method according to claim 1, characterized in that according to the received data of the user's requested flight-prohibition, the flight control apparatus transmits an alarm and its own real-time position information and the data of the user's requested flight-prohibition to the nearest supervision center, and receives the temporary piloting data from the supervision center.

6. A method according to claim 1 or 3, characterized in that, the manipulation device of the aircraft has an identifier for identifying true or false of the identity or status of the pilot;
   if the identification result is true or the aircraft includes no identifier, the identification logic value of the pilot is set true by the main computer, and the aircraft accepts the manual control of the pilot or the control of automatic pilot, and at the same time makes comparison and calculation on the basis of the information of flight-prohibition area and the flight data of the aircraft; when relevant abnormality occurs, the identification logic value of the pilot is set false by the main computer, and when the relevant condition becomes normal after a rectifying action by the aircraft, the identification logic value of the pilot is set to true by the main computer;
   if the identification is false, the aircraft does not accept the manual control of the pilot, but only accepts the control of automatic pilot instructed by the main computer, protects the information of flight-prohibition area and the flight data of the aircraft, protects the oil and power supply on the aircraft, and do not accept the instruction of stopping the running of the engine during flight; and the aircraft transmits its own position information and an alarm and receives temporary piloting data from the nearest supervision center, and at the same time makes comparison and calculation on the basis of the information of flight-prohibition area and the flight data of the aircraft; and
   the main computer automatically selects to perform the pilotage of the supervision center or target emergency protective flight based on the result of the above said comparison and calculation.

7. A method according to claim 6, characterized in that the automatic pilot control of the aircraft instructed by the main computer is performed according to the flight data and the information of flight-prohibition area that cannot be amended by the personnel on the aircraft.

8. A method according to claim 1, characterized in that the flight control apparatus is provided in a backup manner, and has at least one backup apparatus, and the aircraft has at least two copy of concealed backup power supplies.

9. A preventive method for preventing suicidal hijack by means of aircraft-carried global position system electronic map, a flight control apparatus being provided in an aircraft, the flight control apparatus comprising:
   (a) flight-prohibition database (E), which is pre-programmed and fixed with electronic map values of lowest limited height and latitude and longitude of the flight-prohibition ground destinations within the whole airspace, which values cannot be amended by the personnel on the aircraft;

(b) emergency database (G): including emergency sub-database (D1) and (D2), the emergency sub-database (D1) and (D2) including ground data received and controlled by the radio receiver and sub-computer, the emergency sub-database (D1) and (D2) of the emergency database (G) being readable-and-writable storage which can be set as write-protective, or encrypted readable-and-writable storage;

emergency sub-database (D1), for storing the temporary piloting data transmitted from a ground supervision center, for use in performing flight when protecting a flight-prohibition target;

emergency sub-database (D2) for storing the geographic mark information of the stationary or movable targets on the ground or water being requested flight-prohibition protection, the information being transmitted from ground users in the world, the geographic mark including the position data of the users requesting flight-prohibition protection, determined by a global position receiver; and (c) a main computer in the flight control apparatus automatically determining true or false; H value and the protective threshold of height of airspace being automatically set according to the type of the aircraft; the flight control apparatus of the aircraft using the above data to automatically select the flight manner of the aircraft to execute ground piloted flight or emergency protective flight, in case of yawing and protecting a flight-prohibition target.

10. A preventive method for preventing suicidal hijack by means of aircraft-carried global position system electronic map, a flight control apparatus being provided in an aircraft, and the flight control apparatus includes information of flight-prohibition area, the method comprising:

A) providing the flight-prohibition area information as follows:

(i) pre-programming electronic map values of lowest limited height and latitude and longitude of the flight-prohibition ground destinations within the whole airspace, which values cannot be amended by the personnel on the aircraft and are fixed in a flight-prohibition database (E);

(ii) receiving and controlling ground data by the radio receiver and sub-computer in the aircraft, which ground data is read/written from/in an emergency database (G), which includes emergency sub-database (D1) and (D2), in a readable-and-writable storage manner which can be set as write-protective, or in an encrypted readable-and-writable storage manner;

(a) storing in the emergency sub-database (D1) temporary piloting data transmitted from a ground supervision center, for use in performing flight when protecting a flight-prohibition target;

(b) storing in the emergency sub-database (D2) the geographic mark information of stationary or movable targets on the ground or water being requested flight-prohibition protection, the information being transmitted from ground users all over the world, the geographic mark including the position data of the users requesting flight-prohibition protection, which position data is determined by a global position receiver; and a main computer in the aircraft sets a value H and a protective threshold of height of airspace according to the type of the aircraft; and B) the flight control apparatus of the aircraft automatically determining true or false according to the information of flight-prohibition area and the flight data of the aircraft, and automatically selecting to cause the aircraft to perform the pilotage of the supervision center or target emergency protective flight in case of yawing or protecting a flight-prohibition target.

* * * * *